Patented Dec. 3, 1946

2,411,970

UNITED STATES PATENT OFFICE 2,411,970

7,8-DIMETHYL TOCOL AND PROCESS FOR THE PREPARATION OF THE SAME

Paul Karrer, Zurich, and Otto Isler, Basel, Switzerland, assignors to Hoffmann-La Roche Inc., Nutley, N. J., a corporation of New Jersey No Drawing. Application August 12, 1941, Serial No. 406,556. In Switzerland March 31, 1938

10 Claims. (Cl. 260—333)

The present invention relates to a novel compound, 7,8-dimethyltocol of the formula

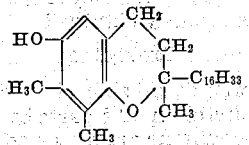

and a process for producing the same.

This application is a continuation-in-part of our earlier application Serial No. 231,846, filed September 26, 1938.

Evans and collaborators (Mem. Univ. California, vol. 8, year 1927) discovered that a nutritive factor which is indispensable for spermatogenesis in male rats and the successful completion of an existing pregnancy in female rats is contained in wheat germ oil and various foodstuffs. They named the new biological factor vitamin E and described a biological method of determination using female rats. Evans, Emerson and Emerson (J. Biol. Chem., vol. 113, year 1936, page 319, and vol. 122, year 1937, page 99) succeeded in isolating three distinct chemical substances from wheat germ oil and various other vegetable oils which are responsible for the vitamin E action of the starting materials. These closely related compounds were named α-, β-, and γ-tocopherols. Investigations by Fernholz (J. Amer. Chem. Soc., vol. 59, year 1937, page 1154; vol. 60, year 1938, page 700), Karrer and collaborators (Helvetica Chimica Acta, vol. 20, year 1937, page 1422; vol. 21, year 1938, page 309), Bergel Todd and collaborators (Biochem. J., vol. 31, year 1937, page 2257; J. Chem. Soc., year 1938, page 253), as well as John and collaborators (Zeitschrift für physiologische Chemie, vol. 250, year 1937, page 11; vol. 252, year 1938, pages 201, 208), confirm and supplement the knowledge of the first-named investigators regarding tocopherols.

Natural α-tocopherol was characterized by the empirical formula $C_{29}H_{50}O_2$, by an allophanate melting at 158° C., by a p-nitrophenylurethane melting at 131° C., and a sublimate of durohydroquinone on thermal decomposition. β-Tocopherol possesses the impirical formula $C_{28}H_{48}O_2$, yields an allophanate melting at 143–144° C. and a sublimate of trimethylhydroquinone on thermal decomposition. An allophenate melting at 135° C. was produced from γ-tocopherol which has the empirical formula $C_{28}H_{48}O_2$.

It has now been found that 7,8-dimethyltocol of the formula

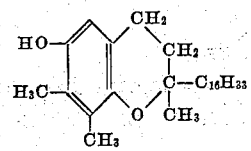

which is racemic at the carbon atom in position 2 of the chromane ring, possesses vitamin E activity. This compound may be prepared by reacting 2,3-dimethylhydroquinone with phytol, isophytol, or phytyl halides under acid conditions and preferably in the presence of acid condensing agents. The reaction may, for example, be carried out in the presence of anhydrous zinc chloride, formic acid or while passing gaseous hydrogen chloride through the reaction mixture. It has also been found particularly suitable to employ a combination of zinc chloride and hydrogen chloride.

The new compound is a light yellow, slightly viscous oil, the allophanate of which melts at 146° C. In the cold, the new compound gradually reduces alcoholic silver nitrate solution; on heating the reduction proceeds rapidly. The compound dissolves in concentrated sulfuric acid with a yellow color, and the solution fluoresces intensively after a few hours' exposure to ultra violet light. The solution of the compound in chloroform yields a dark brown coloration on the addition of tetranitromethane, which gradually clears up.

The new compound is intended to be used as a pharmaceutical preparation or as a starting material for the manufacture of pharmaceutical preparations.

Example 1

2 parts by weight of 2,3-dimethylhydroquinone, 6.5 parts by weight of phytyl bromide of the formula

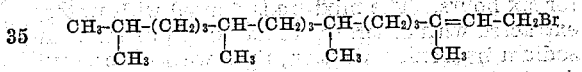

1.5 parts by weight of zinc chloride and 20 parts by weight of benzene are boiled for four hours under reflux. The reaction mixture is then treated with water, the ligroin layer removed, washed with potash solution, then with water, and the solvent evaporated. The residue is dissolved in a small quantity of low-boiling petroleum ether and a chromatogram is prepared on an aluminium oxide column.

The chromatogram of the product gives a narrow, brownish layer in the upper part of the absorption column, then a yellow ring, and, at the foot thereof, a nearly colorless zone. By eluting the brownish layer with a mixture of ether and methanol, the expected condensation product of the following formula is obtained.

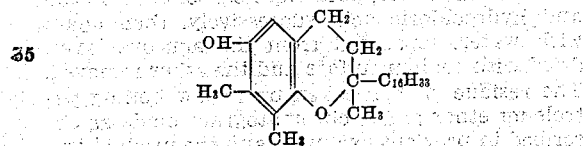

It is a viscous oil which has a strong reducing action. Its analysis corresponds with the formula $C_{28}H_{48}O_2$. The compound possesses an active hydrogen atom (calculated 0.24 per cent, found 0.24 per cent active hydrogen). When tested on rats which had been kept on a vitamin E-free diet, the compound proved fully active in a dose of 10 mg.

*Example 2*

4 parts by weight of phytol, 2.5 parts by weight of 2,3-dimethylhydroquinone, 1 part by weight of anhydrous zinc chloride are heated to 180° C. for one-half hour with stirring and introducing carbon dioxide into the melt. The latter becomes homogeneous. After cooling, the product is treated with ether and water, the ether solution separated, washed with potassium hydroxide solution, then with water, and dried with sodium sulfate solution. The ether is removed and the residue taken up in low boiling petroleum ether and a chromatogram prepared on an aluminium oxide column. The developed chromatogram shows a narrow, brownish layer in the upper part of the absorption column and then a yellow ring and a principal zone that is nearly colorless. The eluate of the brownish layer corresponds to the formula:

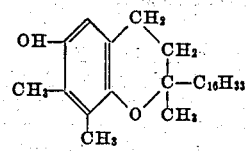

It is a viscous oil possessing one active hydrogen atom as shown by the fact that when submitted to the Zerewitinoff determination 0.24 per cent of an active hydrogen atom is shown. When tested on rats kept on a vitamin-E-free diet, the compound was fully active in doses of 10 mg.

*Example 3*

1.5 parts by weight of 2,3-dimethylhydroquinone, 3 parts by weight of isophytol of the formula

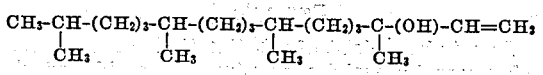

are heated in 10 parts of anhydrous formic acid for six hours. The mixture is diluted with water, extracted with ether, the ether layer washed with sodium hydroxide solution, then with water, and dried over sodium sulfate and the solvent removed. The residue is taken up with low boiling petroleum ether, is chromatogramed in the manner of the previous example to obtain the same product.

*Example 4*

4 parts by weight of phytol, 2.5 parts by weight of 2,3-dimethylhydroquinone and 1 part by weight of zinc chloride are suspended in 10 parts by weight of decalin and heated to 150° C. and the temperature is maintained while passing carbon dioxide through the suspension. The solution becomes yellowish brown, the product is cooled, water and ether added while still stirring, and the ether solution separated off. This solution is washed with water, potassium carbonate solution and hydrochloric acid successively, then again with water, separated from the aqueous layer, dried with sodium sulfate and the ether removed. The residue is then taken up in low boiling petroleum ether and a chromatogram made as described in previous examples and the product isolated as in the previous examples.

*Example 5*

4 parts by weight of 2,3-dimethylhydroquinone are suspended in 50 parts by weight of petroleum ether, boiling point 80° C., and 3 parts by weight of anhydrous zinc chloride and 10 parts by weight of a phytylhalide prepared by the addition of hydrogen bromide to phytyl bromide, are added, and the reaction product heated in the current of nitrogen for four hours in an oil bath maintained at 140° C. Hydrogen bromide is evolved and finally, when this has ceased, the product is treated with water, much petroleum ether is added, and the benzine layer thoroughly washed with Claisen's solution, then with water, dried and adsorbed on an aluminium oxide column and eluted in the manner described in the previous examples. The product so obtained is identical with the dimethyltocol previously obtained.

*Example 6*

1 part by weight of zinc chloride, 5 parts by weight of isophytol and 2.5 parts by weight of 2,3-dimethylhydroquinone are dissolved in 20 parts by volume of ether and 20 parts by volume of benzol added, the mixture being warmed to a temperature of 50–60° C. A rapid stream of dry hydrogen chloride is passed through the solution which is heated and stirred under reflux for 4 hours until hydrogen chloride is evolved at the top of the condenser. The cooled solution is poured into water, the ether-benzol layer washed with hydrochloric acid, 10 per cent sodium hydroxide, and finally several times with water containing sodium chloride to facilitate separation. After drying with sodium sulfate the solvents are removed and the residue is distilled in high vacuo.

We claim:

1. In a process for the manufacture of a tocopherol product, the steps of producing a tocopherol of the formula

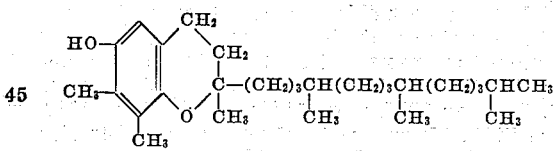

by condensing 2,3-dimethylhydroquinone with an aliphatic di-terpene derivative of the formula

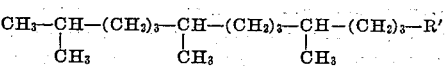

wherein R' represents one of the following radicals:

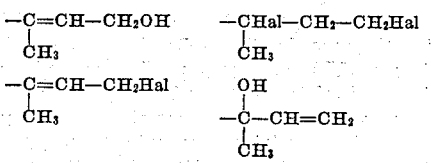

under acid conditions, and recovering a tocopherol product from the reaction mixture thus obtained.

2. In a process for the manufacture of a tocopherol product, the steps of producing a tocopherol of the formula

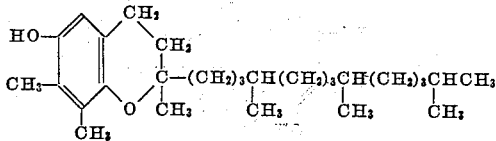

by condensing 2,3-dimethylhydroquinone with an aliphatic di-terpene derivative of the formula

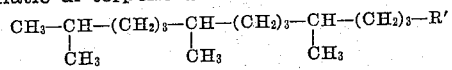

wherein R' represents one of the following radicals:

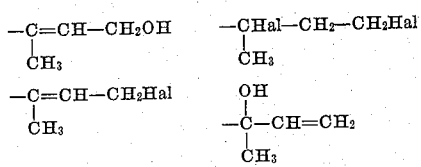

in the presence of zinc chloride, and recovering a tocopherol product from the reaction mixture thus obtained.

3. In a process for the manufacture of a tocopherol product, the steps of producing gamma tocopherol of the formula:

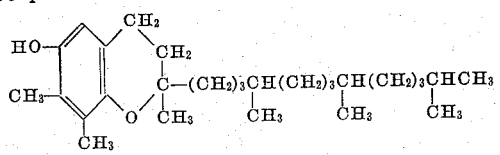

which comprises condensing 2,3-dimethylhydroquinone with a phytylhalide under acid conditions, and recovering a tocopherol product from the reaction mixture thus obtained.

4. In a process for the manufacture of a tocopherol product, the steps of producing gamma tocopherol of the formula

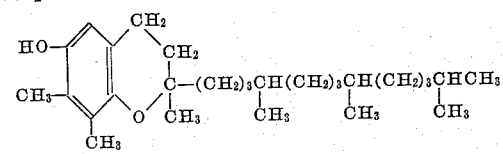

which comprises condensing 2,3-dimethylhydroquinone with phytyl bromide of the formula

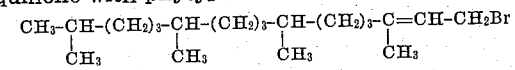

under acid conditions, and recovering a tocopherol product from the reaction mixture thus obtained.

5. In a process for the manufacture of a tocopherol product, the steps of producing gamma tocopherol of the formula

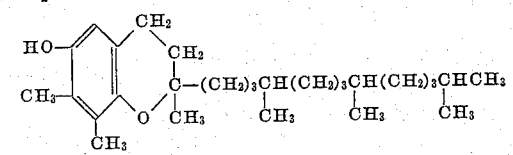

which comprises condensing 2,3-dimethyl hydroquinone with phytol under acid conditions, and recovering a tocopherol product from the reaction mixture thus obtained.

6. In a process for the manufacture of a tocopherol product, the steps of producing gamma tocopherol of the formula

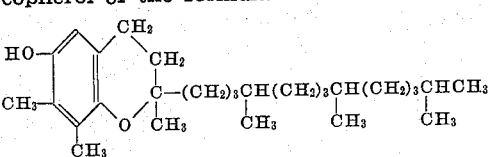

which comprises condensing 2,3-dimethyl hydroquinone with phytol in the presence of zinc chloride, and recovering a tocopherol product from the reaction mixture thus obtained.

7. In a process for the manufacture of a tocopherol product, the steps of producing a tocopherol of the formula

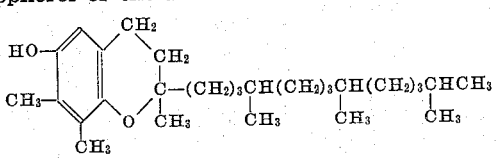

which comprises condensing 2,3-dimethyl hydroquinone with isophytol under acid conditions, and recovering a tocopherol product from the reaction mixture thus obtained.

8. In a process for the manufacture of a tocopherol product, the steps of producing a tocopherol of the formula

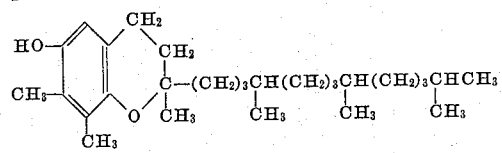

which comprises condensing 2,3-dimethyl hydroquinone with isophytol in the presence of zinc chloride, and recovering a tocopherol product from the reaction mixture thus obtained.

9. A completely racemic synthetic gamma tocopherol of the formula

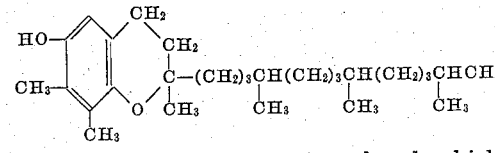

10. A synthetic gamma tocopherol which is racemic at the carbon atom in position 2 of the chromane ring and of the formula:

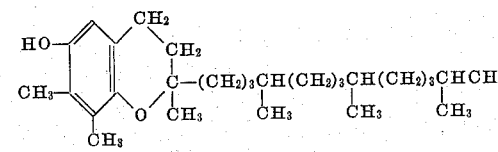

PAUL KARRER.
OTTO ISLER.